United States Patent
Beckett

(10) Patent No.: US 6,200,625 B1
(45) Date of Patent: *Mar. 13, 2001

(54) PREPARATION OF CHOCOLATE PRODUCTS WITH LIMONENE TO REDUCE FAT CONTENT

(75) Inventor: Stephen Thomas Beckett, Wigginton (GB)

(73) Assignee: Nestec S.A., Vevey (CH)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/121,497

(22) Filed: Jul. 23, 1998

(30) Foreign Application Priority Data

Jul. 24, 1997 (GB) .................................... 9715685

(51) Int. Cl.$^7$ ....................................................... A23G 1/00
(52) U.S. Cl. ........................................... 426/631; 426/660
(58) Field of Search .................................... 426/631, 660

(56) References Cited

U.S. PATENT DOCUMENTS

| 4,810,516 | | 3/1989 | Kong-Chan | 426/548 |
|---|---|---|---|---|
| 5,360,621 | * | 11/1994 | Mentink | 426/631 |
| 5,464,649 | | 11/1995 | St. John et al. | 426/660 |
| 5,629,040 | * | 5/1997 | Takemori | 426/660 |
| 5,709,903 | * | 1/1998 | St John | 426/660 |
| 5,776,536 | * | 7/1998 | Tremblay | 426/660 |

FOREIGN PATENT DOCUMENTS

| 1003493 | 4/1992 | (BE) . | |
|---|---|---|---|
| 9619923 | 7/1996 | (EP) | A23G/1/00 |
| 961398 | 6/1964 | (GB) . | |
| 8809127 | 12/1988 | (WO) . | |

OTHER PUBLICATIONS

Braddock & Cadwallader 1992 Citrus By—Products Manufacture for Food Use Food Technology, Feb. Issue p 105–110.*
Nagy 1977 Citrus Science and Technology vol. 1 AVI Publishing Co., Westport CT p 266–275, 282–297, 355–367, 377–379, 382,383,427–429, 438–457.*
Nagy 1977 Citrus Science and Technology vol. 2 AVI Publishing Co. Westport CT p 290–307.*
Furia 1975 Fenarolis Handbook of Flavor Ingreedients 2nd edition, vol. 2 CRC Press Cleveland Ohio p 319.*
Hui (editor) 1996 Baileys Industrial Oil and Fat Products vol. 2 5th edition John Wiley —Sons Inc. New York p 35, 36, 180, 181, 252, 253, 537, 538, 539.*
Wolf Cohn 1994 Step by Step Irresistible Chocolate Smithmark Publishers Inc. p 8–12.*
Derwent Publications Ltd., Abstract, Accession No. 1983–44993K, abstract of Japanese Patent Document No. JP58 053 995 (1983).
Beckett, Editor, Industrial Chocolate Manufacture and Use, Second Ed., Chapman & Hall/Blackie Academic & Professional, Glasglow and New York, NY, 1994, pp. 139, 146–151, 155 and 242–257.
Minifie, Chocolate, Cocoa, and Confectionery: Science and Technology, Third Ed., Van Nostrand Reinhold/Chapman & Hall 1989, New York, NY, pp. 111–137, 183, 205–221, 271–294, 453–457 and 471–498.

* cited by examiner

Primary Examiner—Carolyn Paden
(74) Attorney, Agent, or Firm—Vogt & O'Donnell, LLP

(57) ABSTRACT

The amount of a fat ingredient employed to produce a chocolate product is reduced by preparing the chocolate product with limonene as an ingredient so that a reduced-fat product is obtained, particularly for preparing a product having a fat content of from, by weight based upon a total product weight, of from 16% to 25%. An oil containing the limonene, particularly a deodorized oil, may be employed for providing the limonene.

20 Claims, No Drawings

PREPARATION OF CHOCOLATE PRODUCTS WITH LIMONENE TO REDUCE FAT CONTENT

BACKGROUND OF THE INVENTION

The present invention relates to reduced-fat/low-fat chocolate products and preparation of the same.

Chocolate and chocolate-type products have high fat and energy contents and are differentiated from most other foods by their texture. This is due to the melting properties of the cocoa butter or cocoa butter substitutes, which enable the chocolate and chocolate-type products to be solid at normal room temperatures and yet to melt easily in the mouth. The flow properties of liquid chocolate are important for the following reasons:

a) Since chocolate is processed in a liquid state and most products are produced by enrobing or moulding, the viscosity of the liquid chocolate should be controlled so that it is not be too high.

b) A high viscosity will give a poor texture or mouthfeel and will result in the chocolate being harder to melt causing the product to remain longer in the mouth and becoming more difficult to swallow. In extreme cases the chocolate can have a fudge-like texture.

The fat content of chocolate may vary from about 25% to about 40% by weight depending on whether it is plain, milk or white chocolate but is usually from about 30% to 34% by weight based on the total weight of the chocolate. However, the liquid phase of liquid chocolate is the fat and if the fat content is reduced, the viscosity is increased making it more difficult to use for enrobing or moulding and imparting an undesirable texture or mouthfeel. As stated in Chocolate, Cocoa and Confectionery: Science and Technology, Third Edition, Van Nostrand Reinhold, New York (1989) at page 205 "Good-quality, finely ground chocolates with total fat contents down to 28 percent can now be produced and satisfactorily molded. Lower-quality chocolates with coarser particle size can be produced down to 25%, Particularly with milk chocolates, quality suffers with fat contents below 30%, the texture becoming pasty with lack of snap".

One method of reducing the fat content while maintaining the texture is to use fat replacers, such as SALADTRIM fat replacer, which are not digested as fats and have a very low calorific value. The replacers are not, however, universally accepted in chocolate products and some are restricted in their level of consumption owing to the risk of unpleasant side-effects.

Finished chocolate usually contains a substantial quantity of ultrafine particles such as sugar, cocoa solids and milk solids below 2 microns in size giving a large surface area and large amounts of fat, e.g. cocoa butter, are required to coat such particles so that the chocolate can flow properly in manufacturing operations, and another method of reducing the fat content while maintaining the texture is to control the particle size of the solid particles in order to reduce the amount of or to substantially eliminate the ultrafine particles and thereby reduce the surface area to be coated with the fat. However, such methods are rather cumbersome and not very efficient.

SUMMARY OF THE INVENTION

It has been found surprisingly that by adding limonene or limonene-containing substances to chocolate containing a reduced amount of fat, the resultant chocolate has a lower viscosity, is softer and melts more easily in the mouth when compared with a similar chocolate containing a similar reduced amount of fat but which does not contain limonene or limonene-containing substances.

According to the present invention there is provided a reduced-fat chocolate or fat-containing confectionery material containing up to 5% by weight of limonene or limonene-containing substances.

The present invention also provides a process for producing a reduced-fat chocolate or fat-containing confectionery material containing up to 5% by weight of limonene or limonene-containing substances comprising adding limonene or a limonene-containing substance to liquid chocolate ingredients, the limonene or limonene-containing substance being added conveniently to the liquid chocolate ingredients before, during, or after conching.

A reduced-fat chocolate may be obtained by the process of the present invention with good texture and mouthfeel without the need to reduce the surface area by decreasing the amount of or eliminating ultrafine particles.

DETAILED DESCRIPTION OF THE INVENTION

In accordance with the present invention, the chocolate may be dark, milk or white chocolate. Fat-containing confectionery materials may include sugar, milk-derived components, and fat and solids from vegetable or cocoa sources in differing proportions having a moisture content less than 10%, more usually less than 5% by weight. They may be chocolate substitutes containing direct cocoa butter replacements, stearines, coconut oil, palm oil, butter or any mixture thereof; nut pastes such as peanut butter and fat; praline; confectioner's coatings used for covering cakes usually comprising chocolate analogues with cocoa butter replaced by a cheaper non-tempering fat; or CARAMAC candy sold by Nestle comprising non-cocoa butter fats, sugar and milk.

By a reduced-fat chocolate is meant a chocolate which contains a lower than normal amount of fat which, in the absence of limonene or limonene-containing substances, causes the quality of the chocolate to suffer. For example, in the case of milk chocolate, the amount of fat present in the chocolate may be less than 30% by weight. Preferably, for both milk chocolate and other chocolate or fat-containing confectionery material, the amount of fat present is preferably less than 28% by weight and more preferably from 16% to 25% by weight based on the total weight of the chocolate.

Limonene is a diterpene and exists in d- and l-forms. It is naturally present as the d-form in various ethereal oils such as oils of lemon, orange, grapefruit, mandarin, caraway, dill and bergamot in amounts from about 80% to about 95% together with flavouring substances such as aldehydes and esters. The oil is usually extracted from the peel. Orange oil is widely used as a flavour in chocolate, e.g. in amounts of from 0.01 to 0.1% by weight.

If desired, the oil may be added as such to the reduced-fat chocolate. Advantageously, the oil is deodorised to give the limonene which is added to the chocolate. Particularly preferred are deodorised orange or grapefruit oils.

The amount of limonene present in the reduced-fat chocolate is preferably from 0.5 to 3%, and especially from 1.5 to 2.5% by weight based on the weight of the chocolate.

EXAMPLES

The following Examples further illustrate the present invention. Parts and percentages are given by weight.

Example 1

A chocolate is produced having the following ingredient recipe:

| | |
|---|---|
| Sugar | 53.3 parts |
| Skimmed milk powder | 18.7 parts |
| Butter oil | 4.0 parts |
| Cocoa butter | 9.5 parts |
| Cocoa liquor | 11.0 parts |
| Vanillin | 0.03 parts |
| Lecithin | 1.0 parts |
| PGPR* | 0.5 parts |
| Deodorised Orange Oil | 2.0 parts |

*Polyglycerolpolyricinoleate

The above chocolate contains 21% by weight of fat (excluding the deodorised orange oil). The deodorised orange oil is added to the liquid chocolate ingredients after conching. After tempering, the chocolate paste is deposited into a mould and sets to give a tablet.

Taste testings carried out indicated that the chocolate has a texture and mouthfeel of a chocolate with a considerably higher fat content than 21%.

Example 2

By carrying out a similar procedure to that described in Example 1 but replacing the deodorised orange oil with a similar amount of deodorised grapefruit oil, taste testings carried out again indicated that the chocolate has a texture and mouthfeel of a chocolate with a considerably higher fat content than 21%.

Comparative Example

By carrying out a similar procedure to that described in Example 1 but replacing the deodorised orange oil with a similar amount of cocoa butter, the taste testings carried out indicated that the chocolate has a texture and mouthfeel of a chocolate expected from a chocolate having a fat content of 23%, i.e. it was harder to melt, remained longer in the mouth and was more difficult to swallow.

What is claimed is:

1. A process for preparation of a reduced-fat chocolate product comprising preparing a chocolate product with ingredients which include a fat and a deodorized ethereal oil, wherein the deodorized ethereal oil ingredient comprises limonene in an amount, for reducing chocolate product viscosity, so that, by weight based upon a total weight of the chocolate product prepared, the chocolate product prepared contains the fat and the deodorized ethereal oil in an amount of from 16% to 25% and the limonene in an amount of from 0.5% to 5%.

2. A process according to claim 1 comprising preparing the chocolate product so that the limonene is in an amount of from 0.5% to 3%.

3. A process according to claim 1 comprising preparing the chocolate product so that the limonene is in an amount of from 1.5% to 2%.

4. A process according to claim 1 comprising conching ingredients in a liquid form to obtain a conched product for preparing the chocolate product and adding the deodorized ethereal oil to the liquid-form ingredients during the conching.

5. A process according to claim 1 comprising conching ingredients to obtain a conched product in liquid form for preparing the chocolate product and adding the deodorized ethereal oil to the liquid-form conched product.

6. A process according to claim 1 comprising conching the ingredients in a liquid form and adding the deodorized ethereal oil to the liquid-form ingredients prior to the conching.

7. A process according to claim 1 wherein the deodorized ethereal oil is selected from the group consisting of ethereal oils which contain limonene and which are obtained from an orange, a grapefruit, a lemon, a mandarin, a bergamot, caraway and dill.

8. A process according to claim 1 wherein the deodorized ethereal oil is selected from the group of ethereal oils which contain limonene and which are obtained from an orange and a grapefruit.

9. A process for reducing the viscosity of a chocolate product for reducing an amount of fat present in a chocolate product wherein the process comprises combining ingredients including a fat to obtain a mass of ingredients for preparing a chocolate product, conching the mass of ingredients to obtain a conched mass and tempering the conched mass to obtain a tempered chocolate product and (i) combining limonene with the ingredients to obtain the mass of ingredients, or (ii) adding limonene to the mass of ingredients prior to or during conching or (iii) adding limonene to the conched mass prior to tempering so that the limonene is present in the tempered chocolate in an amount, by weight based upon tempered chocolate product total weight, of from 0.5% to 5% so that a tempered chocolate product is obtained which has, as compared to a chocolate product which is obtained by being conched and tempered like the tempered chocolate product and by being prepared with identical ingredients but without limonene and having a same fat content as the tempered chocolate product, a lower viscosity than the chocolate product without limonene.

10. A process according to claim 9 comprising combining the limonene with the ingredients so that the limonene is present in the reduced-fat product in an amount of from 0.5% to 3%.

11. A process according to claim 9 comprising combining the limonene with the ingredients so that the limonene is present in the reduced-fat product in an amount of from 1.5% to 2.5%.

12. A process according to claim 9 wherein the limonene is a component of an ethereal oil.

13. A process according to claim 12 wherein the ethereal oil is a deodorized ethereal oil.

14. A process according to claim 13 wherein the deodorized ethereal oil is selected from the group consisting of ethereal oils which contain limonene and which are obtained from an orange, a grapefruit, a lemon, a mandarin, a bergamot, caraway and dill.

15. A process according to claim 13 wherein the deodorized ethereal oil is selected from the group consisting of ethereal oils which contain limonene and which are obtained from an orange and a grapefruit.

16. A process according to claim 9 wherein the ingredients and the limonene are combined to prepare a reduced-fat milk chocolate product wherein the fat is present and in an amount of less than 28% by weight based upon the reduced-fat product total weight.

17. A process according to claim 16 wherein the limonene is a component of a deodorized ethereal oil and wherein the reduced-fat chocolate product is prepared so that the deodorized oil and fat are present in the reduced-fat product and in an amount of less than 28% by weight based upon the reduced-fat product total weight.

18. A process according to claim 9 wherein the ingredients and the limonene are combined to prepare a reduced-fat chocolate product wherein the fat is in an amount of from 16% to less than 25% by weight.

19. A process according to claim 18 wherein the limonene is a component of a deodorized ethereal oil and wherein the reduced-fat chocolate product is prepared so that the deodorized oil and fat are present in the reduced-fat product and in an amount of from 16% to less than 25% by weight based upon the reduced-fat product total weight.

20. The tempered chocolate product of the process of claim 9.

\* \* \* \* \*